(12) United States Patent
Yagi et al.

(10) Patent No.: US 11,613,223 B2
(45) Date of Patent: Mar. 28, 2023

(54) VEHICLE BODY STRUCTURE

(71) Applicant: TOYOTA JIDOSHA KABUSHIKI KAISHA, Toyota (JP)

(72) Inventors: Yuna Yagi, Toyota (JP); Jun Aoki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/506,030

(22) Filed: Oct. 20, 2021

(65) Prior Publication Data
US 2022/0126773 A1 Apr. 28, 2022

(30) Foreign Application Priority Data

Oct. 22, 2020 (JP) .............................. JP2020-177261

(51) Int. Cl.
*B60R 21/02* (2006.01)
*B60N 2/01* (2006.01)
*B60N 2/68* (2006.01)
*B60R 22/24* (2006.01)

(52) U.S. Cl.
CPC ............ *B60R 21/026* (2013.01); *B60N 2/012* (2013.01); *B60N 2/686* (2013.01); *B60R 22/24* (2013.01)

(58) Field of Classification Search
CPC . B60R 21/026; B60R 22/24; B60R 2021/028; B60N 2/012; B60N 2/686; B60N 2/4235; B60N 2/4249
See application file for complete search history.

(56) References Cited

U.S. PATENT DOCUMENTS

| 2011/0062748 | A1* | 3/2011 | Kaita | ..................... | B60J 5/0487 |
| | | | | | 296/146.9 |
| 2012/0161427 | A1* | 6/2012 | Tsumiyama | ........... | B60J 5/0487 |
| | | | | | 292/341.15 |
| 2014/0034409 | A1* | 2/2014 | Nakamura | ............... | B60K 5/00 |
| | | | | | 180/291 |

(Continued)

FOREIGN PATENT DOCUMENTS

| EP | 1426231 A1 * | 6/2004 | ........... B60N 2/3022 |
| EP | 1574390 A1 * | 9/2005 | ........... B60N 2/3031 |

(Continued)

OTHER PUBLICATIONS

Machine Translation of WO2019115461 (Year: 2019).*
Machine Translation of EP1426231 (Year: 2004).*

*Primary Examiner* — Paul N Dickson
*Assistant Examiner* — Kurtis Nielson
(74) *Attorney, Agent, or Firm* — Dinsmore & Shohl LLP (57) ABSTRACT

A vehicle includes: a partition that separates a driver cabin into which a driver climbs and a passenger cabin into which a passenger climbs and that is coupled to a roof and a floor; a driver's seat base member to which a driver's seat is fixed; and a side support member that is coupled to the partition and the driver's seat base member and partially located on a lateral side of the buttocks or the hips of the driver seated in the driver's seat. A shoulder anchor of a driver's seatbelt device and a shoulder anchor of a passenger's seatbelt device are fixed to the partition. A side support member restrains the driver from moving in a left-right direction and retains the driver in the driver's seat.

20 Claims, 4 Drawing Sheets

(56) References Cited

U.S. PATENT DOCUMENTS

| | | | | |
|---|---|---|---|---|
| 2014/0042791 A1* | 2/2014 | Gardner | ............... | B60N 2/643 |
| | | | | 297/452.14 |
| 2017/0036717 A1* | 2/2017 | Wakabayashi | ..... | B60H 1/00285 |
| 2018/0105067 A1* | 4/2018 | Ajisaka | ................... | B60N 2/14 |
| 2018/0361880 A1* | 12/2018 | Bryant | ............... | B60N 2/3025 |
| 2021/0078525 A1* | 3/2021 | Hitzfelder | ............. | B60N 2/005 |
| 2021/0245702 A1* | 8/2021 | Watanabe | ............... | B60R 22/12 |

FOREIGN PATENT DOCUMENTS

| | | | | | |
|---|---|---|---|---|---|
| FR | 2632580 | A1 | * | 12/1989 | |
| JP | 2000-079863 | A | | 3/2000 | |
| WO | WO-2004018266 | A1 | * | 3/2004 | ............ B60N 2/005 |
| WO | WO-2010004111 | A1 | * | 1/2010 | .......... B60N 2/3015 |
| WO | WO-2019115461 | A1 | * | 6/2019 | .......... B60R 21/026 |
| WO | WO-2019135038 | A1 | * | 7/2019 | .......... B60R 21/026 |

* cited by examiner

VEHICLE BODY STRUCTURE

CROSS-REFERENCE TO RELATED APPLICATION

This application claims priority to Japanese Patent Application No. 2020-177261 filed on Oct. 22, 2020, incorporated herein by reference in its entirety.

BACKGROUND

1. Technical Field

The present disclosure relates to a vehicle body structure, particularly to a vehicle body structure around a driver cabin.

2. Description of Related Art

Recently, various technologies aiming to reduce the impact of a vehicle collision on passengers have been developed. Japanese Unexamined Patent Application Publication No. 2000-79863 (JP 2000-79863 A) shows a vehicle in which a driver is located at the center in a vehicle width direction, with a large space left on each side of the driver. In the event of a side-impact collision, an airbag is deployed in the space on each side of the driver to restrain the driver from moving in a left-right direction.

SUMMARY

When the space in which an airbag is to be deployed is large, the airbag needs to be large in size, so that the cost increases and a space to house the airbag needs to be secured. The present disclosure aims to provide structure, other than an airbag, for restraining a driver from moving in a left-right direction and retaining the driver in the driver cabin in the event of a side-impact collision.

A vehicle body structure according to the present disclosure includes: a partition that separates a driver cabin into which a driver climbs and a passenger cabin into which a passenger climbs and that is coupled to a roof and a floor; a driver's seat base member to which a driver's seat is fixed; and a side support member that is coupled to the partition and the driver's seat base member and partially located on a lateral side of the buttocks or the hips of the driver seated in the driver's seat.

In the event of a side-impact collision, the side support member can restrain the driver from moving in a left-right direction and retain the driver in the driver's seat.

The side support member may be coupled to the partition at a position higher than a hip point of the driver seated in the driver's seat, and may be coupled to the driver's seat base member at a position on a front side of the hip point. This can enhance the strength of the side support member against a force applied from the driver.

A shoulder anchor of a driver's seatbelt device may be fixed to the partition. Since the side support member is coupled to the partition, deformation of the partition to which a force is applied from the driver's shoulder anchor can be mitigated in the event of a frontal collision.

The partition may include one or more vertical framework members that extend in an up-down direction, and the side support member may be coupled to one of the vertical framework members to which the shoulder anchor of the driver's seatbelt device is fixed. When the shoulder anchor and the side support member are coupled to a common framework member, a force input from the shoulder anchor can be efficiently borne by the side support member.

Shoulder anchors of a plurality of passenger's seatbelt devices may be fixed to the partition. Since the side support member is coupled to the partition, deformation of the partition to which a force is applied from the passenger's shoulder anchors can be mitigated in the event of a rear-end collision.

The partition may include one or more horizontal framework members that extend in a left-right direction, and shoulder anchors of a plurality of passenger's seatbelt devices may be fixed to a common one of the horizontal framework members. Further, the horizontal framework member to which the passenger's shoulder anchors are fixed may be coupled to the vertical framework member to which the driver's shoulder anchor is fixed and the side support member is coupled. Thus, a force input from the passenger's shoulder anchors is efficiently transmitted to the side support member through the vertical and horizontal framework members.

The driver's seat base member may be coupled at a rear end portion to one of the horizontal framework members, and this horizontal framework member may be disposed at a position lower than the horizontal framework member to which the passenger's shoulder anchors are fixed. Thus, the side support member that is coupled to the partition at a higher position than the horizontal framework member to which the driver's seat base member is coupled bears part of a force input from the passenger's shoulder anchors.

A prime mover compartment in which a prime mover for driving the vehicle is mounted may be defined at a lower part of the driver cabin. The driver's seat may be installed at a position higher than the prime mover compartment. A passage for the driver to pass through may be formed on one lateral side of the driver's seat. The side support member may be disposed on a passage side of the driver's seat. This configuration can effectively provide support for the driver on the passage side.

The present disclosure is advantageous in restraining a driver from moving in the left-right direction and retaining the driver in the seat in the event of a side-impact collision.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described below in accordance with the drawings. In the following description, unless otherwise noted, words that represent relative positions and directions, such as front, rear, left, right, up, and down, represent relative positions and directions with respect to a vehicle. In the drawings, the directions of arrows FR, UP, and LH indicate frontward, upward, and leftward, respectively.

Figure 1:
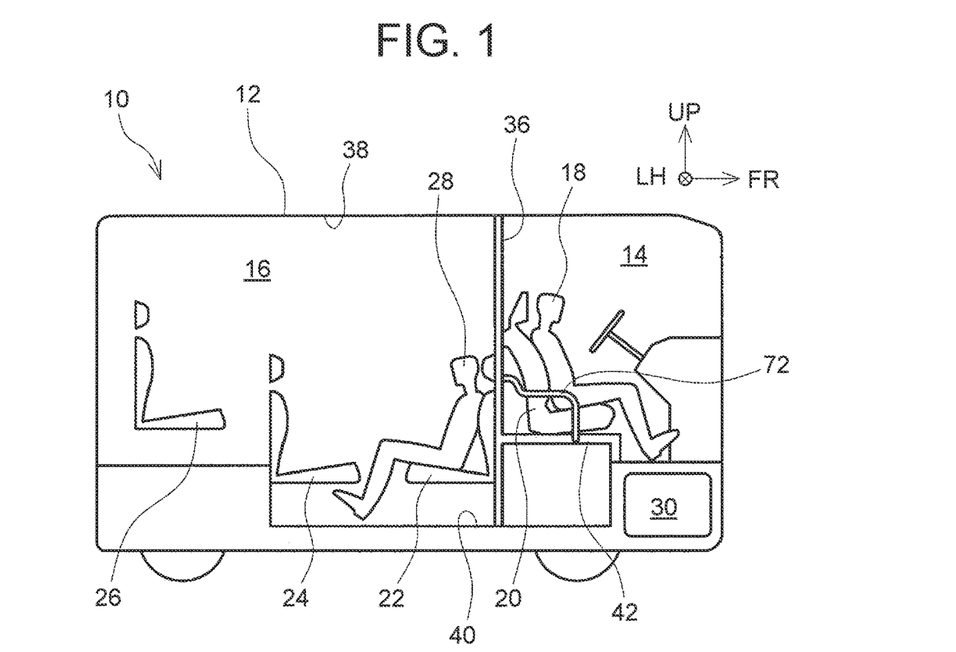
FIG. 1 is a side view schematically showing the configuration of a vehicle 10 of an embodiment.
Figure 2:
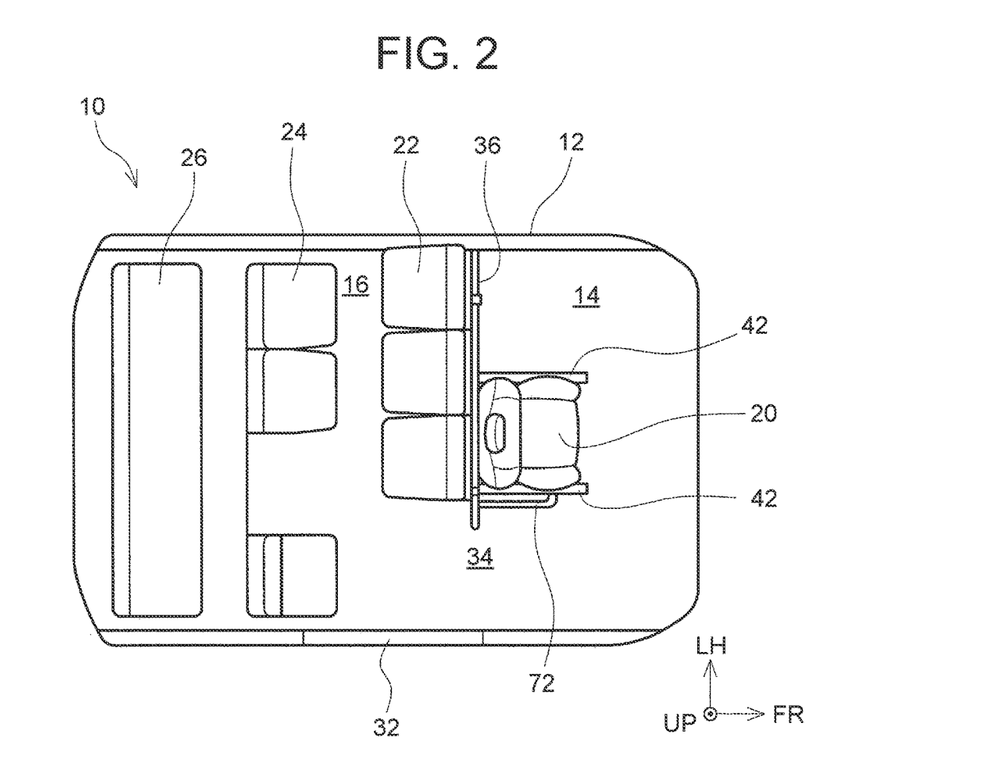
FIG. 2 is a plan view schematically showing the configuration of the vehicle 10 of the embodiment.

FIG. 1 and FIG. 2 are views schematically showing the configuration of a vehicle 10 of the present disclosure, and FIG. 1 is a side view and FIG. 2 is a plan view. The vehicle 10 is a vehicle for an automobile that carry many passengers, i.e., a so-called bus. A vehicle body 12 of the vehicle 10 has a substantially rectangular parallelepiped shape, with a driver cabin 14 into which a driver climbs provided at a front part and with a passenger cabin 16 into which passengers climb provided in a space behind the driver cabin 14. A driver's seat 20 in which the driver 18 sits is disposed in the driver cabin 14. The driver's seat 20 may be disposed roughly at the center of the vehicle body 12 in a left-right direction. In the passenger cabin 16, three rows of passenger seats 22, 24, 26 for passengers are disposed. The first row of passenger seats 22 disposed on a frontmost side is installed such that passengers 28 face rearward when seated, while the second and third rows of passenger seats 24, 26 are installed such that passengers 28 face frontward. When the first row of passenger seats 22 is not used, seat parts of the seats may be flipped up and folded onto backrests thereof to create an extra space around the knees of passengers seated in the second row of passenger seats 24.

A prime mover compartment 30 in which a prime mover that drives the vehicle 10 is mounted is defined at a lower part of the driver cabin 14. While the prime mover is an electric motor in the vehicle 10, another prime mover, for example, an engine such as a gasoline engine or a diesel engine may also be used. The driver's seat 20 is installed at a position higher than the prime mover compartment 30, and when the driver 18 is seated, the prime mover compartment 30 is located under the feet of the driver 18.

A door 32 is provided roughly at the center of a right side surface of the vehicle body 12 in a front-rear direction, and the driver 18 and passengers get on and out of the vehicle 10 through the door 32. The driver 18 climbs into the driver cabin 14 by passing through a passage 34 provided on a lateral side of the driver's seat 20 and sits in the driver's seat 20. While the door 32 is disposed on a lateral side of the passenger cabin 16 in the vehicle 10, a door may be provided on a lateral side of the driver cabin 14 that is located on the front side of the passenger cabin 16. In this case, passengers climb into the passenger cabin 16 by passing through the passage 34 on the lateral side of the driver's seat 20. The vehicle 10 with the door 32 provided in the right side surface is adapted to regions where laws require vehicles to travel on the right side of the road, and a door is provided in a left side surface for regions where vehicles travel on the left side.

A partition 36 is provided between the driver cabin 14 and the passenger cabin 16. The partition 36 is fixed by being coupled at an upper part to a roof 38 of the vehicle body 12 and coupled at a lower part to a floor 40 of the vehicle body 12. To secure the passage 34, the partition 36 is provided so as to leave a clearance between the partition 36 and a right side wall. The partition 36 may be a wall that separates the driver cabin 14 and the passenger cabin 16 by extending from end to end between the roof 38 and the floor 40, or may constitute only a part of a wall.

The first row of passenger seats 22 may be mounted to the partition 36, and in this case, the partition 36 serves as a base member of the first row of passenger seats 22. Further, a rear end of a driver's seat base member 42 to which the driver's seat 20 is fixed is coupled to the partition 36. A front end of the driver's seat base member 42 may be coupled to a lower vehicle body of the vehicle body 12, particularly a cross-member that is disposed above the prime mover compartment 30.

Figure 3:
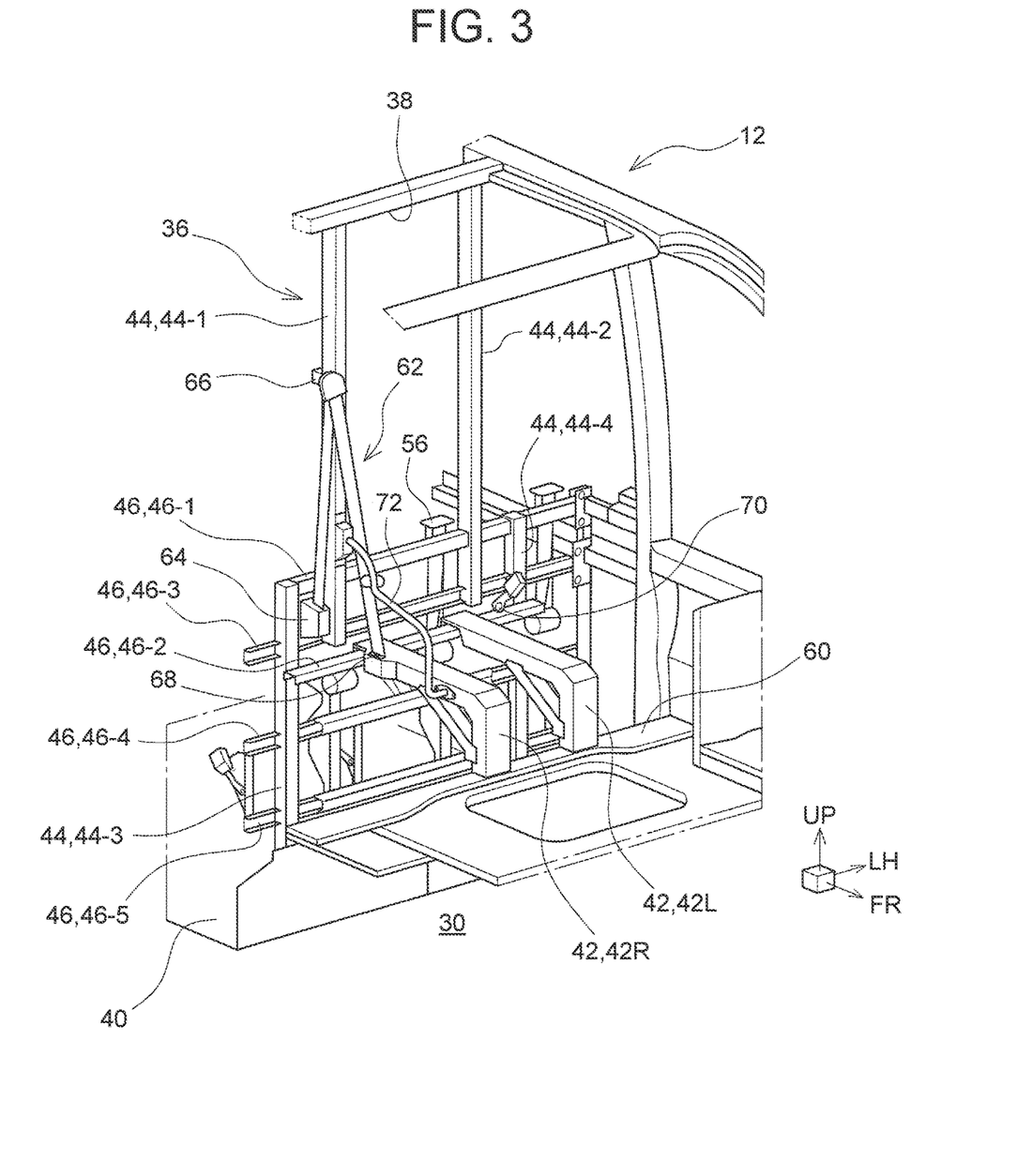
FIG. 3 is a perspective view showing a state of a front structure of a vehicle body 12 of the embodiment as seen from a front side.
Figure 4:
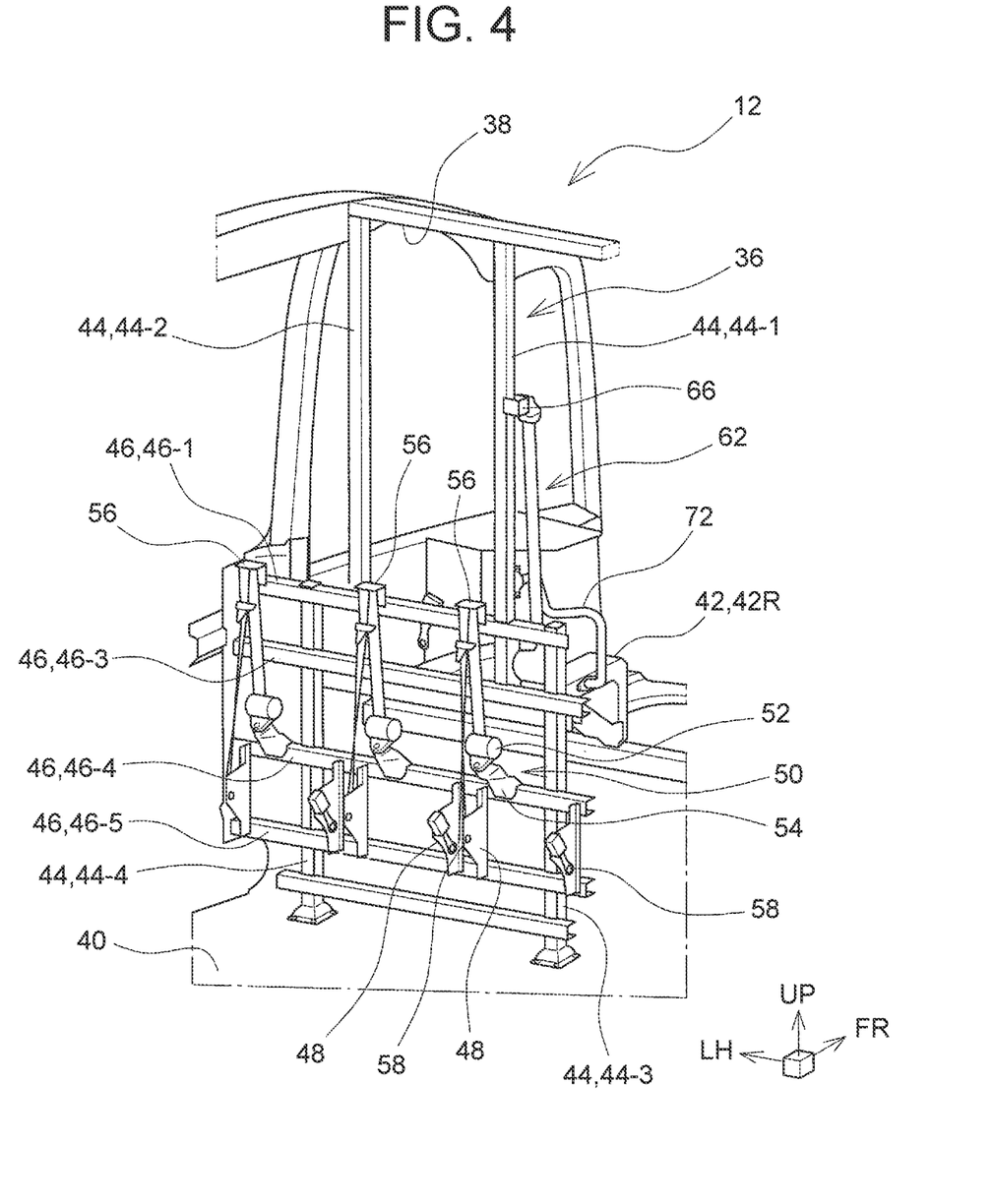
FIG. 4 is a perspective view showing a state of the front structure of the vehicle body 12 of the embodiment as seen from a rear side.
Figure 5:
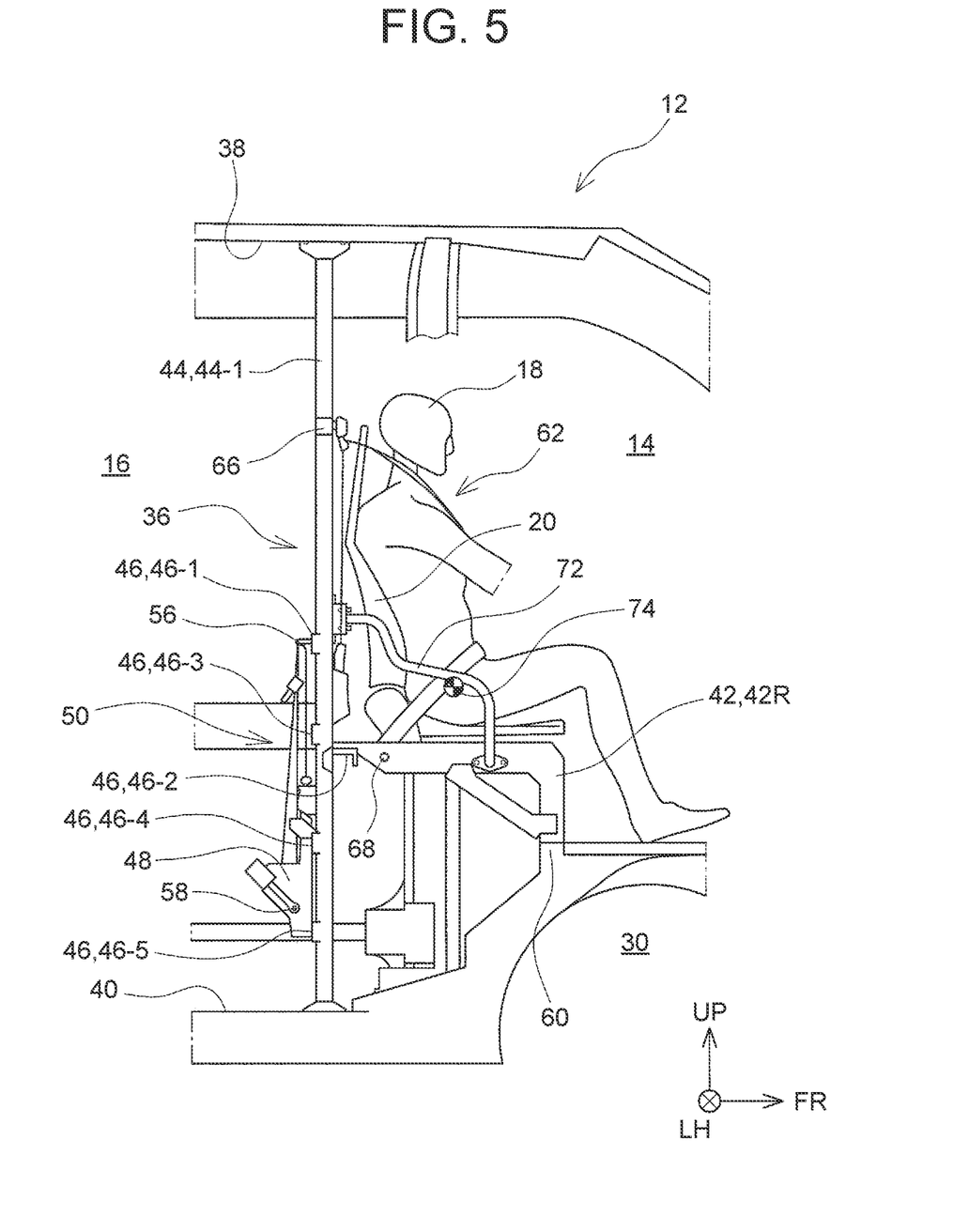
FIG. 5 is a side view showing the front structure of the vehicle body 12 of the embodiment.

FIG. 3 is a perspective view of the partition 36 as seen from the side of the driver cabin 14. FIG. 4 is a perspective view of the partition 36 as seen from the side of the passenger cabin 16. FIG. 5 is a view of the partition 36 as seen from the right side. In these drawings, only framework members that constitute a framework of the partition 36 are shown as the partition 36, and plate-shaped members are fixed to these framework members as necessary to form a wall. The plate-shaped members may be mounted on the entire framework members from the floor 40 to the roof 38, or may be mounted mainly on a lower part so as to leave a clearance at an upper part.

The partition 36 includes a plurality of framework members that is disposed vertically and horizontally. Framework members that are disposed so as to extend in an up-down direction will be referred to as vertical framework members 44. Framework members that are disposed so as to extend in the left-right direction will be referred to as horizontal framework members 46. The vertical framework members 44 include two upper vertical framework members 44-1, 44-2 that are fixed at upper ends to the roof 38, and two lower vertical framework members 44-3, 44-4 that are fixed at lower ends to the floor 40. The two lower vertical framework members 44-3, 44-4 are disposed on outer sides of the two upper vertical framework members 44-1, 44-2, and the upper vertical framework members 44-1, 44-2 and the lower vertical framework members 44-3, 44-4 are coupled together through two horizontal framework members 46. Alternatively, vertical framework members 44 that each extend from the roof 38 all the way to the floor 40 without being divided may be used.

The horizontal framework members 46 include four members disposed on the side of the passenger cabin 16 and one member disposed on the side of the driver cabin 14 relatively to the vertical framework members 44. One of the horizontal framework members 46 on the side of the passenger cabin 16 that is disposed at the highest position will be referred to as a first horizontal framework member 46-1, and the horizontal framework member on the side of the driver cabin 14 will be referred to as a second horizontal framework member 46-2. The other three horizontal framework members 46 on the side of the passenger cabin 16 will be referred to as a third horizontal framework member 46-3, a fourth horizontal framework member 46-4, and a fifth horizontal framework member 46-5 from above. On the side of the passenger cabin 16, the two horizontal framework members, the first horizontal framework member 46-1 disposed at the highest position and the third horizontal framework member 46-3 disposed at the second highest position, couple the upper vertical framework members 44-1, 44-2 and the lower vertical framework members 44-3, 44-4 together. Further, the fourth horizontal framework member 46-4 and the fifth horizontal framework member 46-5 are disposed by being coupled to the lower vertical framework members 44-3, 44-4. The second horizontal framework member 46-2 disposed on the side of the driver cabin 14 is disposed between the third horizontal framework member 46-3 and the fourth horizontal framework member 46-4 in the up-down direction, and is coupled at left and right ends, or near the ends, to the lower vertical framework members 44-3, 44-4.

The first row of passenger seats 22 is fixed to the partition 36. The backrests of the first row of passenger seats 22 are fixed to the third and fourth horizontal framework members 46-3, 46-4, and the seat parts thereof are supported by seat part brackets 48 that are coupled to the fourth and fifth horizontal framework members 46-4, 46-5. The seat parts may be turnably supported by the seat part brackets 48, and are housed by being turned upward so as to be folded onto the backrests. Seatbelt devices 50 for passengers seated in the first row of passenger seats 22 are also fixed to the partition 36. A retractor 52 of each seatbelt device 50 that reels a webbing is fixed to the fourth horizontal framework member 46-4 through a retractor bracket 54. Shoulder anchors 56 are fixed to the first horizontal framework member 46-1, and left and right lap anchors 58 are fixed to the seat part brackets 48. The shoulder anchors 56 will be hereinafter referred to as passenger's shoulder anchors 56.

The driver's seat base member 42 is a substantially L-shaped member, of which a rear end is coupled to the second horizontal framework member 46-2, a front part is bent downward and coupled at a lower end to a cross-member 60 of the lower vehicle body that extends across the driver cabin 14 above the prime mover compartment 30. The driver's seat base member 42 may have a reinforcing member in the form of a brace at a corner of the L-shape. Two driver's seat base members 42 are disposed side by side in the left-right direction, and a frame of the driver's seat 20 is fixed to these members. When the left and right driver's seat base members need to be distinguished from each other, the right one and the left one will be denoted by reference signs 42R and 42L, respectively. When the frame of the driver's seat 20 includes seat tracks, the seat tracks are coupled to the driver's seat base members 42 to allow position adjustment of the driver's seat 20 in the front-rear direction. A seat part of the driver's seat 20 that supports the buttocks of the driver 18 may be fixed to the driver's seat base members 42 and a backrest thereof may be fixed to the partition wall. A retractor 64 and a shoulder anchor 66 of a driver's seatbelt device 62 are fixed to the partition 36, and particularly the shoulder anchor 66 is fixed to the upper vertical framework member 44-1 disposed on the right side. A right lap anchor 68 is fixed to the driver's seat base member 42R, and a left lap anchor 70 is fixed to the driver's seat 20. The shoulder anchor 66 will be hereinafter referred to as a driver's shoulder anchor 66.

A side support member 72 is disposed on a lateral side of the driver's seat 20, particularly on a lateral side of the buttocks or the hips of the driver 18 seated in the driver's seat 20. The side support member 72 is coupled at a rear end to the partition 36, particularly the upper vertical framework member 44-1 on the right side, and coupled at a front end to the driver's seat base member 42, particularly the driver's seat base member 42R on the right side. The side support member 72 is located on the lateral side of the driver 18, close to the driver 18, and restrains the driver 18 from moving rightward. In the event of a side-impact collision in which the vehicle 10 is hit from the right side, the side support member 72 disposed on the right side of the driver 18 supports the driver 18 from the lateral side and thereby helps retain the driver 18, particularly his or her buttocks, in the seat. On the side where the passage 34 is provided, there is a large clearance between the driver 18 and a side surface of the vehicle body, and restraining the driver from moving toward the passage by an airbag requires the airbag to be large in size. In this vehicle 10, the side support member 72 is provided on the side of the passage 34 to restrain the driver from moving toward the passage. A side support member may be provided also on the opposite side where no passage is provided.

The side support member 72 may support the driver 18 at a position higher than the position of a hip point 74 (see FIG. 5), i.e., the hip joint of the driver 18, and at a position on the front side of the hip point 74. The position at which the side support member 72 is coupled to the upper vertical framework member 44-1 may be a position higher than the hip point 74, and the position at which the side support member 72 is coupled to the driver's seat base member 42R may be on the front side of the hip point 74.

The side support member 72 may be formed by bending a rod-shaped member, particularly a hollow rod-shaped member (i.e., a pipe member). The cross-sectional shape of the rod-shaped member may be a circular shape or a polygonal shape, such as a quadrangular shape. Further, the side support member 72 may be formed by a section with a specially shaped cross-section. The side support member 72 can have a substantially L-shape with a part that extends frontward from the upper vertical framework member 44-1 and a part that extends downward from a front end of the part extending frontward. In particular, the side support member 72 has a shape of two steps as a rear end portion is bent so as to reach a higher position. The side support member may be formed by a plate-shaped member other than a rod-shaped member. For example, the side support member may be formed by a plate-shaped member that is provided so as to cover, as seen from the lateral side, a region surrounded by the vertical framework members 44-1, 44-3, the driver's seat base member 42R, and the side support member 72 shown in the drawings. Further, the side support member may be formed by a bent elongated plate that extends along the side support member 72 shown in the drawings.

The side support member 72 functions to mitigate deformation of the partition 36 in a collision. In the event of a frontal collision, a force directed toward the front side is applied to the driver's shoulder anchor 66, and this force acts so as to curve the upper vertical framework member 44-1 toward the front side. The side support member 72 supports the upper vertical framework member 44-1 against such deformation by bracing the upper vertical framework member 44-1. Thus, deformation of the upper vertical framework member 44-1 in a frontal collision is mitigated. In the event of a rear-end collision, a force directed toward the rear side is applied to the passenger's shoulder anchors 56, and this force acts so as to curve the two upper vertical framework members 44-1, 44-2 toward the rear side through the first horizontal framework member 46-1. The side support member 72 supports the upper vertical framework member 44-1 against such deformation by pulling the upper vertical framework member 44-1. Thus, deformation of the upper vertical framework member 44-1 in a rear-end collision is mitigated.

What is claimed is:

1. A vehicle body structure comprising:
   a partition that separates a driver cabin into which a driver climbs and a passenger cabin into which a passenger climbs and that is coupled to a roof and a floor;
   a driver's seat base member to which a driver's seat is fixed, the driver's seat base member having an upper surface and a side surface, the driver's seat coupled to the upper surface of the driver's seat base member; and
   a side support member that is coupled to the partition and the driver's seat base member and configured to be partially located on a lateral side of buttocks or hips of the driver seated in the driver's seat, the side support member having an upper end face coupled to the partition and a lower end face coupled to the side surface of the driver's seat base.

2. The vehicle body structure according to claim 1, wherein the side support member is coupled to the partition at a position configured to be higher than a hip point of the driver seated in the driver's seat, and is coupled to the driver's seat base member at a position configured to be on a front side of the hip point.

3. The vehicle body structure according to claim 1, wherein a shoulder anchor of a driver's seatbelt device is fixed to the partition.

4. The vehicle body structure according to claim 3, wherein the partition includes one or more vertical framework members that extend in an up-down direction, and the side support member is coupled to one of the vertical framework members to which the shoulder anchor of the driver's seatbelt device is fixed.

5. The vehicle body structure according to claim 4, wherein:
the partition includes one or more horizontal framework members that extend in a left-right direction;
shoulder anchors of a plurality of passenger's seatbelt devices are fixed to a common one of the horizontal framework members; and
the horizontal framework member is coupled to the vertical framework member to which the shoulder anchor of the driver's seatbelt device is fixed.

6. The vehicle body structure according to claim 5, wherein:
the driver's seat base member is coupled at a rear end portion to a second horizontal framework member different from a first horizontal framework member that is the horizontal framework member to which the shoulder anchors of the passenger's seatbelt devices are fixed; and
the second horizontal framework member is disposed at a position lower than the first horizontal framework member.

7. The vehicle body structure according to claim 1, wherein a shoulder anchor of a passenger's seatbelt device is fixed to the partition.

8. The vehicle body structure according to claim 7, wherein the partition includes one or more horizontal framework members that extend in a left-right direction, and shoulder anchors of a plurality of passenger's seatbelt devices are fixed to a common one of the horizontal framework members.

9. The vehicle body structure according to claim 1, wherein:
a prime mover compartment in which a prime mover for driving the vehicle is mounted is defined at a lower part of the driver cabin;
the driver's seat is installed at a position higher than the prime mover compartment;
a passage for the driver to pass through is formed on one lateral side of the driver's seat; and
the side support member is disposed on a passage side of the driver's seat.

10. A vehicle body structure comprising:
a partition that separates a driver cabin into which a driver climbs and a passenger cabin into which a passenger climbs and that is coupled to a roof and a floor;
a driver's seat base member to which a driver's seat is fixed, the driver's seat base member having an upper surface and a side surface, the driver's seat coupled to the upper surface of the driver's seat base member; and
a side support member that is coupled to the partition and the driver's seat base member and configured to be partially located on a lateral side of buttocks or hips of the driver seated in the driver's seat, the side support member having an upper end portion coupled to the partition and a lower end portion coupled to the side surface of the driver's seat base.

11. The vehicle body structure according to claim 10, wherein the side support member is coupled to the partition at a position configured to be higher than a hip point of the driver seated in the driver's seat, and is coupled to the driver's seat base member at a position configured to be on a front side of the hip point.

12. The vehicle body structure according to claim 10, wherein a shoulder anchor of a driver's seatbelt device is fixed to the partition.

13. The vehicle body structure according to claim 12, wherein the partition includes one or more vertical framework members that extend in an up-down direction, and the side support member is coupled to one of the vertical framework members to which the shoulder anchor of the driver's seatbelt device is fixed.

14. The vehicle body structure according to claim 13, wherein:
the partition includes one or more horizontal framework members that extend in a left-right direction;
shoulder anchors of a plurality of passenger's seatbelt devices are fixed to a common one of the horizontal framework members; and
the horizontal framework member is coupled to the vertical framework member to which the shoulder anchor of the driver's seatbelt device is fixed.

15. The vehicle body structure according to claim 14, wherein:
the driver's seat base member is coupled at a rear end portion to a second horizontal framework member different from a first horizontal framework member that is the horizontal framework member to which the shoulder anchors of the passenger's seatbelt devices are fixed; and
the second horizontal framework member is disposed at a position lower than the first horizontal framework member.

16. The vehicle body structure according to claim 10, wherein a shoulder anchor of a passenger's seatbelt device is fixed to the partition.

17. The vehicle body structure according to claim 16, wherein the partition includes one or more horizontal framework members that extend in a left-right direction, and shoulder anchors of a plurality of passenger's seatbelt devices are fixed to a common one of the horizontal framework members.

18. The vehicle body structure according to claim 10, wherein:
a prime mover compartment in which a prime mover for driving the vehicle is mounted is defined at a lower part of the driver cabin;
the driver's seat is installed at a position higher than the prime mover compartment;
a passage for the driver to pass through is formed on one lateral side of the driver's seat; and
the side support member is disposed on a passage side of the driver's seat.

19. A vehicle body structure comprising:
a partition that separates a driver cabin into which a driver climbs and a passenger cabin into which a passenger climbs and that is coupled to a roof and a floor;
a driver's seat base member to which a driver's seat is fixed;
a side support member that is coupled to the partition and the driver's seat base member and configured to be partially located on a lateral side of buttocks or hips of the driver seated in the driver's seat; and a shoulder anchor of a driver's seatbelt device is fixed to the partition, wherein, the partition includes one or more vertical framework members that extend in an up-down direction, and the side support member is coupled to one of the vertical framework members to which the shoulder anchor of the driver's seatbelt device is fixed, the partition includes one or more horizontal framework members that extend in a left-right direction, shoulder anchors of a plurality of passenger's seatbelt devices are fixed to a common one of the horizontal framework members; and the horizontal framework member is coupled to the vertical framework member to which the shoulder anchor of the driver's seatbelt device is fixed, the driver's seat base member is coupled at a rear end portion to a second horizontal framework member different from a first horizontal framework member that is the horizontal framework member to which the shoulder anchors of the passenger's seatbelt devices are fixed, and the second horizontal framework member is disposed at a position lower than the first horizontal framework member.

20. The vehicle body structure according to claim 19, wherein the side support member is coupled to the partition at a position configured to be higher than a hip point of the driver seated in the driver's seat, and is coupled to the driver's seat base member at a position configured to be on a front side of the hip point.

* * * * *